United States Patent
Bos et al.

(10) Patent No.: US 8,268,937 B2
(45) Date of Patent: Sep. 18, 2012

(54) CROSSLINKABLE ARAMID COPOLYMERS

(75) Inventors: Johannes Bos, Apeldoorn (NL); Sandra Corien Noordewier, Arnhem (NL)

(73) Assignee: Teijin Aramid B.V., Arnhem (NL)

( * ) Notice: Subject to any disclaimer, the term of this patent is extended or adjusted under 35 U.S.C. 154(b) by 748 days.

(21) Appl. No.: 12/310,135

(22) PCT Filed: Sep. 1, 2007

(86) PCT No.: PCT/EP2007/007653
§ 371 (c)(1),
(2), (4) Date: Feb. 12, 2009

(87) PCT Pub. No.: WO2008/028605
PCT Pub. Date: Mar. 13, 2008

(65) Prior Publication Data
US 2009/0318660 A1 Dec. 24, 2009

(30) Foreign Application Priority Data
Sep. 9, 2006 (EP) .................................... 06018906

(51) Int. Cl.
*C08L 77/00* (2006.01)

(52) U.S. Cl. ........ 525/432; 525/240; 525/434; 528/310; 528/329.1; 528/331; 528/335; 528/339; 528/340; 528/348

(58) Field of Classification Search .................. 525/240, 525/434, 432; 528/310, 329.1, 331, 335, 528/339, 340, 348
See application file for complete search history.

(56) References Cited

U.S. PATENT DOCUMENTS

| | | | |
|---|---|---|---|
| 3,386,965 A | | 6/1968 | Huffman et al. |
| 3,904,519 A | * | 9/1975 | McKinney et al. ........... 210/654 |
| 4,086,215 A | | 4/1978 | Kurihara et al. |
| 5,212,258 A | | 5/1993 | Irwin |
| 2003/0150557 A1 | | 8/2003 | Sezi et al. |

FOREIGN PATENT DOCUMENTS

EP  0 021 484 A1  1/1981

OTHER PUBLICATIONS

Mar. 6, 2007 Search Report issued in European Application No. 06 01 8906.

* cited by examiner

*Primary Examiner* — David W Wu
*Assistant Examiner* — Robert Jones, Jr.
(74) *Attorney, Agent, or Firm* — Oliff & Berridge, PLC

(57) ABSTRACT

The invention pertains to an aramid copolymer composition comprising an aramid copolymer having at least one arylene carboxylic acid moiety and at least one hydroxyarylene moiety, or comprising an aramid copolymer having at least one arylene carboxylic acid moiety or having at least one hydroxyarylene moiety, and a crosslinker agent. The invention further relates to crosslinked copolymers derived thereof and shaped articles comprising said crosslinked copolymers.

11 Claims, No Drawings

CROSSLINKABLE ARAMID COPOLYMERS

The invention pertains to a crosslinkable aramid copolymer composition, to crosslinked aramid copolymer obtained thereof, and to a method of obtaining said crosslinked aramid copolymer. The invention further relates to shaped products and methods for making these, and to spin dopes comprising the crosslinkable copolymers.

Wholly aromatic polyamides, i.e. aramid, and their preparations are known for decades. These materials are useful for producing fibers, filaments, fibrids, threads, films, pulp, paper-like sheets and other shaped articles, and they are widely used for their excellent thermal, mechanical, and chemical resistance. Commercial products are marketed under trade names such as Twaron®, Kevlar®, and Technora®.

Although these materials are commercially extremely successful there is still room for improvement, particularly since the transversal properties, such as strength and chemical resistance are susceptible for improvement. It is an objective of the present invention to provide materials that have at least similar properties as these commercial products in the longitudinal direction, and improving the transversal properties.

It is another objective of the invention to provide materials that have other improved properties, such as enhanced fire protective properties.

It is also an objective of the invention to obtain aramid products having improved dielectric and compressive properties.

It is also an objective of the invention to obtain aramid products having improved chemical resistance, in particular to sulfuric acid, which can make such aramid products suitable for use in demisters and other aerosol scavengers.

It was now found that these objectives could be obtained when the known aramid polymers are modified to allow crosslinking.

In U.S. Pat. No. 5,212,258 an aramid copolymer was described which contains carboxylic side groups by copolymerization of aromatic diamines, aromatic diacid (derivatives), and diamino-phenylene carboxylic acid, to give aramid block copolymers containing carboxylic groups. These copolymers are used as such and no further reactions of these copolymers, such as crosslinking, were described. Moreover, these copolymers as such and the compositions thereof are not crosslinkable.

To this end the invention pertains to an aramid copolymer composition comprising an aramid copolymer having at least one arylene carboxylic acid moiety and at least one hydroxyarylene moiety, or comprising an aramid copolymer having at least one arylene carboxylic acid moiety or having at least one hydroxyarylene moiety, and a crosslinker agent.

These copolymers contain with regard to the known aramid copolymers, such as Twaron®, functional aromatic carboxylic and optionally aromatic hydroxy groups. If these copolymers comprise both aromatic carboxylic and aromatic hydroxy groups, a molecule of such copolymer can crosslink with another molecule of said copolymer. If these copolymers comprise only aromatic carboxylic groups, the composition should contain a crosslinking agent having at least two functional groups.

The term "crosslinker" has the common meaning in the art, i.e. a compound that is able to connect two larger molecules (usually polymers) to each other by forming a covalent bond therewith. The connecting group is called linker group. Ionic bonding of molecules or ions with such large molecules is thereby not considered as crosslinking, but as salt formation.

The hydroxy group and the carboxylic group may under suitable conditions react and form an ester linkage under expelling a water molecule. It is possible to first convert the carboxylic group to a carboxylic derivative to enhance this reaction. For instance, the carboxylic group may first be converted to a carboxylic chloride or tosylate, and then be reacted with the hydroxy group which is contained in another molecule of the same copolymer, or which is present in another molecule.

If a crosslinker agent is used for crosslinking the carboxylic acid or hydroxy group reacts with the crosslinker agent at one functional group of the crosslinker, whereas the second functional group reacts with another molecule of the aramid copolymer, to give a crosslinked aramid copolymer having linker groups. Suitable crosslinker groups include epoxides, (blocked) isocyanates, aziridines, azetidines, oxazolines, polyalcohols, polyvinyl pyrrolidone (PVP), melamines, and oligomers and polymers having at least two carboxylic groups such as polyacrylic acid, polymethacrylic acid, poly (acrylic-co-maleic acid), poly(3,3',4,4'-bis-phenyltetracarboxylic dianhydride-co-1,4-diamine)amic acid, poly(1-vinyl-2-pyrolidone-co-maleic acid anhydride).

Suitable isocyanates include aliphatic and cycloaliphatic and especially aromatic polyisocyanates and combinations thereof. Representative of these types are diisocyanates such as meta- or para-phenylene diisocyanate, toluene-2,4-diisocyanate (TDI), toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4'-diisocyanate, diphenylmethane-2,4'-diisocyanate, 4,4'-diphenylene diisocyanate, 3,3'-dimethoxy-4,4'-diphenylenediisocyanate and 3,3'-dimethyldiphenylpropane-4,4'-diisocyanate, triisocyanates such as toluene-2,4,6-triisocyanate, and polyisocyanates such as 4,4'-dimethyldiphenylmethane-2,2',5,5'-tetraisocyanate, and the various polymethylene polyphenyl polyisocyanates. A crude polyisocyanate may also be used in the practice of this invention, such as the crude toluene diisocyanate obtained by the phosgenation of a mixture of toluene diamines or the crude diphenylmethane diisocyanate obtained by the phosgenation of crude methylene diphenylamine.

Suitable polyalcohols include polyvinylalcohol (PVA) which have an average hydroxy equivalent weight of from about 20 to about 300, preferably from about 40 to about 100. Further, such polyols will generally contain from about 2 to about 8 hydroxy groups per molecule. Examples of suitable polyols include those commercially available under the trademark Lutrol®, Desmophen® and Bayhydrol®.

A particularly useful polyol is an aramid copolymer comprising aromatic units and at least two aromatic hydroxy groups. Such copolymers can for instance be made by polymerizing PPD and TDC in the presence of an aromatic hydroxy group-containing monomer, such as a dihydroxybenzidine derivative, more particularly in the presence of 3,3'-dihydroxybenzidine (DHB). DHB and other aromatic hydroxy group-containing monomers as such are also a useful crosslinker for aramid copolymers having a carboxylic moiety.

Suitable polyvinyl pyrrolidone include vinyl pyrrolidone polymers having a molecular weight of 400 and higher. Preferred PVP has a molecular weight of 100.000 and higher.

Suitable polyepoxide include diglycidyl ether of bisphenol-A and diglycidyl ether of bisphenol-F, polyglycidyl ethers which are obtainable under the trade name Denacol® and epoxy resins which are obtainable under the trade name Araldite®.

Suitable aziridines and azetidines include trimethylolpropane tris-(2-methyl-1-aziridine propionate) which is commercially available under the trade name crosslinker CX-100® (ex. DSM), and crosslinkers from the XC series of Shanghai Zealchem.

Suitable oxazolines include aromatic compounds such as 1,4-PBO (1,4-phenylene bis-oxazoline), 2,2'-bis-(2-oxazoline), thiodiethylene-bis-(2-oxazoline), tetramethylene-bis-(2-oxazoline), and oxydiethylene-bis-(2-oxazoline).

Suitable melamines include Cymel® type resins.

Suitable polyacrylic acid include polymers of acrylic acid and methacrylic acid having molecular weights between 500 to about 1,500,000, and more preferably from about 10,000 to about 500,000.

It is preferred to maintain the linear properties of the aramid by applying para-aramid polymers. For obtaining sufficient crosslinking at least 1% of the aromatic moieties of the copolymer, and preferably 20% or less to prevent overcrosslinking, should contain carboxylic or hydroxy functional groups.

The copolymers of the invention are made by polymerization methods that are as such well known in the art. Thus the common polymerization reactions of aromatic monomers can be followed, however, by replacing the required part of the usual monomers by monomers having functional carboxylic and/or monomers having functional hydroxy groups. Instead of using monomers having functional carboxylic and/or monomers having functional hydroxy groups, also a monomer can be used containing both a carboxylic acid and a hydroxy group, such as 2,5-diamino-4-hydroxybenzoic acid.

Basically, the method for obtaining the aramid copolymer comprises polymerizing a diaminoarylene, an arylene dicarboxylic acid, or mixing at a copolymers obtained by polymerizing a diaminoarylene, an arylene dicarboxylic acid, and a diaminoarylene carboxylic acid or derivative thereof and/or a hydroxy-diaminoarylene or derivative thereof, and a crosslinking agent.

Suitable monomers for use in polymerization are non-functionalized monomers such as PPD, which is 1,4-phenylene diamine (also known as 1,4-diaminobenzene), and TDC, which is terephthaloyl dichloride (also known as 1,4-benzodiyldichloride), which are the basic components for traditional aramid polymers, and functionalized monomers such as 1,4-diamino-benzoic acid (DABA), 2,5-diaminophenol (DAP), 3,3'-dihydroxybenzidine (DHB), and 2,5-diamino-hydroquinone (DAH), or salts thereof. The chemical formulae are given herein below:

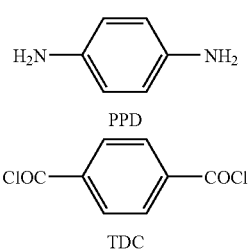

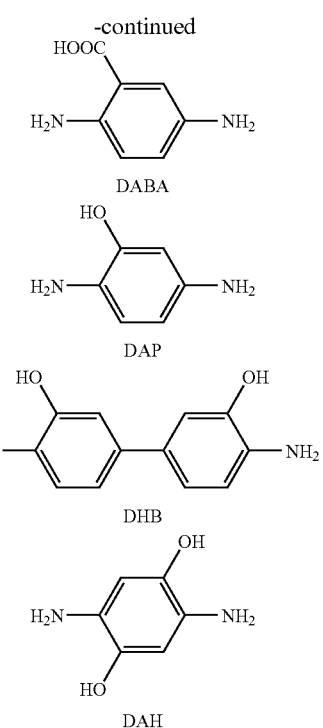

If the aramid copolymer comprises at least one arylene carboxylic acid moiety or at least one aromatic hydroxy group, the blend of the composition should contain a crosslinker agent, such as hydroxy- or carboxy-containing aromatic compound. This crosslinker can also be another aramid copolymer having hydroxy-functional or carboxy-functional groups, or another hydroxy group-containing polymer such as polyvinyl alcohol (PVA) or carboxy group-containing polymer such as polyacrylic acid (PAA). Examples of such monomers are for instance DHB and DAP monomers, and 1,4-PBO:

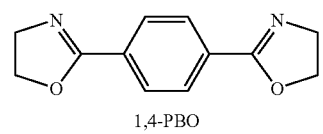

1,4-PBO

The crosslinkable copolymers can be used in spin dopes and the crosslinked polymers can be made thereof. These spin dopes can contain other suitable components such as calcium chloride and various solvents such as NMP (N-methylpyrrolidone). Preferably the solvent is sulfuric acid. These spin dopes can be used to spin fibers, pulp, fibrids, and the like, or can be used to make sheets and films. Shaped articles, such as these above mentioned, therefore are also an object of the inventions.

It was found that polymerization of the monomers including PPD and TDC and up to 20% DABA proceeds smoothly and easily when using known routes for making Twaron®. It was found that this material can be blended and crosslinked with aramids containing OH-groups or other crosslinkers, or can be crosslinked intramolecularly or between two molecules when the aramid copolymers contains carboxylic as well as hydroxy groups by applying heat. Thus a DABA-based aramid with further OH groups in the same polymer chain shows the ability of forming ester linkages and therefore crosslinking.

The invention is illustrated by the following non-limitative examples.

EXAMPLE 1

A clean and dry 2 L flask, supplied with a mechanical stirrer, $N_2$-inlet and outlet and vacuum supply, was charged under nitrogen with 20.719 g of PPD, 3.249 g of DABA, 3.352 g of 1,4-PBO, and 400 ml of dry NMP/$CaCl_2$ (12.1 wt %). The flask was purged twice with nitrogen. The mixture was stirred for 30 min at 150 rpm to dissolve the amines.

The flask was cooled to 10° C. with ice/water. After removing the coolant, the stirring speed was set at 320 rpm and 43.219 g of TDC was brought into the flask through a funnel. The flask was rinsed twice with 25 ml of dry NMP/$CaCl_2$. The flask was closed and the mixture was allowed to react for 20 min under nitrogen flush.

The crumbled product as obtained, together with demi-water, was gently added to a Condux LV15 15/N3 coagulator and the mixture was collected on a stainless steel filter. The product was washed 4 times with 5 L of demi-water, collected in a 2 L glass beaker and dried under vacuum for 24 h at 80° C. to obtain a product having a relative viscosity 5.49.

Curing

About 1 g of this product was heat treated under vacuum at 200° C. for 0.5 h (Büchi oven TO-51).

A mixture of 257.4 mg of heat treated product in 147.64 g of $H_2SO_4$ remained turbid while the not-heat treated product dissolves completely in sulfuric acid to give a clear solution.

COMPARATIVE EXAMPLE

The procedure of Example 1 was repeated without using 1,4-PBO. The mixture of the heat treated product and the not-heat treated product both dissolved completely in sulfuric acid to give a clear solution.

EXAMPLE 2

A clean and dry 2 L flask supplied with a mechanical stirrer, $N_2$-inlet and outlet and vacuum supply, was charged with precisely weighted amounts of PPD (20.715 or 18.164 g) and DABA (3.247 or 6.409 g), and 400 ml of dry NMP/$CaCl_2$. The reactor was purged twice with nitrogen and the mixture was stirred for 30 min at 150 rpm to dissolve the amines.

The flask was cooled to 10° C. with ice/water. After removing the coolant, the stirring speed was set at 320 rpm and a precisely weighted amount of TDC (43.222 or 42.622 g) was brought into the vessel through a funnel. The flask was rinsed twice with 25 ml of dry NMP/$CaCl_2$. The vessel was closed and the mixture was allowed to react for 20 min under nitrogen flush.

The crumbled product together with demi-water was gently added into a Condux LV15 15/N3 coagulator and the mixture was collected on a stainless steel filter. The product was washed 4 times with 5 L of demi-water, collected in a 2 L glass beaker and dried under vacuum for 24 h at 80° C. to obtain a product having a relative viscosity of 6.10 or 3.70, respectively.

The product having a relative viscosity of 6.10 (836.94 mg) together with PVP (41.3 mg, MW $1.3*10^6$) having the formula:

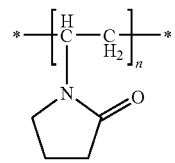

was dissolved in 148.03 g of sulfuric acid. The clear solution was precipitated in water, filtered off, washed and dried under vacuum at 80° C. overnight.

Curing

About 1 g of this composition was heat treated under vacuum at 300° C. for 0.5 h (Büchi oven TO-51) to give a product that remained turbid while the starting non-heat treated product dissolves completely in sulfuric acid resulting in a clear solution.

EXAMPLE 3

A clean and dry 2 L flask supplied with a mechanical stirrer, $N_2$-inlet and outlet and vacuum supply, was charged with 17.253 g of PPD and 6.087 g of DHB and 400 ml of dry NMP/$CaCl_2$. The reactor was purged twice with nitrogen and the mixture was stirred for 30 min at 150 rpm to dissolve the amines.

The flask was cooled to 10° C. with ice/water. After removing the coolant, the stirring speed was set at 320 rpm and a precisely weighted amount of TDC (38.186 g) was brought into the vessel through a funnel. The flask was rinsed twice with 25 ml of dry NMP/$CaCl_2$. The vessel was closed and the mixture was allowed to react for 20 min under nitrogen flush.

The crumbled product together with demi-water was gently added into a Condux LV15 15/N3 coagulator and the mixture was collected on a stainless steel filter. The product was washed 4 times with 5 L of demi-water, collected in a 2 L glass beaker and dried under vacuum for 24 h at 80° C. to obtain a product having a relative viscosity of 6.40.

A precisely weighted amount of 304 or 300 mg of this product together with 306.8 mg of the product of example 2 having an intrinsic viscosity of 6.10 or 307 mg of the product of example 2 having an intrinsic viscosity of 3.70 was dissolved in 100 ml of sulfuric acid. The mixture was injected with a nozzle in water, filtered off, washed and overnight dried under vacuum at 80° C.

Curing

About 1 g of each of these two compositions was heat treated under vacuum at 380° C. for 5 min (Heraeus oven MR170). The cured products did not completely dissolve in sulfuric acid whereas the non-cured blends did.

EXAMPLE 4

A clean and dry 2 L flask supplied with a mechanical stirrer, $N_2$-inlet and outlet and vacuum supply, was charged with 25.5696 g of DABA, 4.5469 g of DHB, and 400 ml of dry NMP/$CaCl_2$. The reactor was purged twice with nitrogen and the mixture was stirred for 30 min at 150 rpm to dissolve the amines.

The flask was cooled to 10° C. with ice/water. After removing the coolant, the stirring speed was set at 320 rpm and a precisely weighted amount of TDC (30.2483 g) was brought into the vessel through a funnel. The flask was rinsed twice with 25 ml of dry NMP/$CaCl_2$. The vessel was closed and the mixture was allowed to react for 20 min under nitrogen flush.

The crumbled product together with demi-water was gently added into a Condux LV15 15/N3 coagulator and the mixture was collected on a stainless steel filter. The product was washed 4 times with 5 L of demi-water, collected in a 2 L glass beaker and dried under vacuum for 24 h at 80° C. to obtain a product having a relative viscosity of 1.8.

Curing

About 1 g of the above obtained product was heat treated under vacuum at 300° C. for 15 min (Büchi oven B580). IR analysis (Biorad FTS 576c equipped with Thunderdome Swap-top module ATR Ge crystal) showed the existence of ester bands (1740 cm-1) indicating that chains are coupled via the reaction between the COOH-group and the OH-group.

EXAMPLE 5

A clean and dry 2 L flask supplied with a mechanical stirrer, $N_2$-inlet and outlet and vacuum supply, was charged with 16.0481 g of PPD, 7.3112 g of DAP.2HCl, 6.001 g of pyridine and 400 ml of dry NMP/$CaCl_2$ with a $CaCl_2$ concentration of 10.06 w %. The reactor was purged twice with nitrogen and the mixture was stirred for 40 min at 150 rpm to dissolve the amines. The flask was cooled to 10° C. with ice/water. After removing the coolant, the stirring speed was set at 320 rpm and a precisely weighted amount of TDC (37.6610 g) was brought into the vessel through a funnel. The flask was rinsed twice with 25 ml of dry NMP/$CaCl_2$. The vessel was closed and the mixture was allowed to react for 20 min under nitrogen flush.

The crumbled product together with demi-water was gently added into a Condux LV15 15/N3 coagulator and the mixture was collected on a stainless steel filter. The product was washed 4 times with 5 L of demi-water, collected in a 2 L glass beaker and dried under vacuum for 24 h at 80° C. to obtain a product having a relative viscosity of 5.12.

Curing

The product was heat-treated under vacuum in each combination of temperature (250, 300, 350, and 400° C.) and duration (2, 3, 5, and 10 min) in a Heraeus oven MR170. Each of the samples of the sixteen combinations contained about 1 g of product. The cured products did not dissolve in sulfuric acid whereas the non-cured blend did.

COMPARATIVE EXAMPLE 6

The previous example 5 was repeated without PAA. A sample cured at 250° C. or 300° C. for 10 min remained completely soluble.

EXAMPLE 7

A clean and dry 2 L flask supplied with a mechanical stirrer, $N_2$-inlet and outlet and vacuum supply, was charged with 16.4263 g of PPD, 8.0911 g of DAH.2HCl, 0.975 of PAA and 400 ml of dry NMP/$CaCl_2$ with a $CaCl_2$ concentration of 10.24 wt %. The reactor was purged twice with nitrogen and the mixture was stirred for 40 min at 150 rpm to dissolve the amines.

The flask was cooled to 10° C. with ice/water. After removing the coolant, the stirring speed was set at 320 rpm and 38.5493 g of TDC was brought into the vessel through a funnel. The flask was rinsed twice with 25 ml of dry NMP/$CaCl_2$. The vessel was closed and the mixture was allowed to react for 45 min under nitrogen flush.

The product together with demi-water was gently added into a Condux LV15 15/N3 coagulator and the mixture was collected on a stainless steel filter. The product was washed 4 times with 5 L of demi-water, collected in a 2 L glass beaker and dried under vacuum for 24 h at 80° C. to obtain a product having a relative viscosity of 2.29.

Curing

The product was heat-treated under vacuum in each combination of temperature (250, 300, 350, and 400° C.) and duration (2, 3, 5, and 10 min) in a Heraeus oven MR170. Each of the samples of the sixteen combinations contained about 1 g of product. The samples heated at 250° C. for at least 5 min or heated at 300° C. did not dissolve in sulfuric acid whereas the non-cured blend did.

COMPARATIVE EXAMPLE 8

The previous example 7 was repeated without PAA. A sample cured at 250° C. or 300° C. for 10 min remained completely soluble.

EXAMPLE 9

A dried 10 L Drais reactor was filled with 175.5 g of PPD, 88.10 g of DHB, 10.8 g of PAA and 4 L of NMP/$CaCl_2$ with a $CaCl_2$ concentration of 11.13 wt %. The solution was cooled to 4° C. and 413.87 g of TDC were added. After addition of the TDC, the polymerization reaction was continued for 31 min.

The crumbled product together with demi-water was gently added into a Condux LV15 15/N3 coagulator and the mixture was collected on a stainless steel filter. The product was washed 8 times with 5 L of demi-water, collected in a 2 L glass beaker and dried under vacuum for 48 h at 80° C. to obtain a product having a relative viscosity of 4.4.

Curing

The product was heat-treated under vacuum in each combination of temperature (250, 300, 350, and 400° C.) and duration (2, 3, 5, and 10 min) in a Heraeus oven MR170. Each of the samples of the sixteen combinations contained about 1 g of product. The samples heated between 200° C. for 10 min and 250° C. for 5 min just swell, while samples heated at 250° C. for 10 min and 300° C. for 10 min remained unaffected in sulfuric acid.

The invention claimed is:

1. A spin dope comprising the crosslinkable aramid copolymer composition in sulfuric acid, wherein the crosslinkable aramid copolymer composition comprises:
   an aramid copolymer having at least one arylene carboxylic acid moiety and at least one hydroxyphenylene moiety;
   an aramid copolymer having at least one hydroxyphenylene moiety, and a crosslinker agent; or
   an aramid copolymer having at least one arylene carboxylic acid moiety, and a crosslinker agent selected from the group consisting of an aramid copolymer having at least two aromatic hydroxyl groups, polyvinyl alcohol, and an aromatic hydroxyl group-containing monomer.

2. The spin dope of claim 1, wherein the arylene carboxylic acid moiety is a phenylene carboxylic moiety.

3. A crosslinkable aramid copolymer composition comprising:
   an aramid copolymer having at least units derived from 1,4-diaminobenzene, 1,4-benzodiyldichloride, 3,3'-dihydroxybenzidine, and 2,5-diaminobenzoic acid;
   an aramid copolymer having at least one hydroxyphenylene moiety, and a crosslinker agent; or
   an aramid copolymer having at least one arylene carboxylic acid moiety having at least units derived from 1,4- diaminobenzene, 1,4-benzodiyldichloride, and 2,5-diaminobenzoic acid, and a crosslinker agent selected from PVA, PVP, and PBO.

4. The crosslinkable aramid copolymer composition of claim 3, wherein the arylene carboxylic acid moiety is a phenylene carboxylic acid moiety.

5. The crosslinkable aramid copolymer composition of claim 3, wherein the aramid copolymer is a copolymer wherein 1-20% of the units is derived from 2,5-diaminobenzoic acid.

6. A crosslinked aramid copolymer obtainable by crosslinking the aramid copolymer composition of claim 3.

7. A method for obtaining the crosslinked aramid copolymer of claim 6 comprising:
   crosslinking the aramid copolymer having at least units derived from 1,4-diaminobenzene, 1,4-benzodiyldichloride, 3,3'-dihydroxybenzidine, and 2,5-diaminobenzoic acid;
   crosslinking the aramid copolymer having at least one hydroxyphenylene moiety, and a crosslinker agent; or
   crosslinking the aramid copolymer having at least one arylene carboxylic acid moiety having at least units derived from 1,4-diaminobenzene, 1,4-benzodiyldichloride, and 2,5-diaminobenzoic acid, in the presence of the crosslinker agent selected from PVA, PVP, and PBO.

8. A shaped article comprising the crosslinked aramid copolymer of claim 6.

9. The shaped article of claim 8 wherein the article is a fiber.

10. A method for making a shaped article comprising:
    shaping the crosslinkable aramid copolymer of claim 3 into a form; followed by
    crosslinking the thus shaped form to the shaped article.

11. The method according to claim 10 wherein shaping the crosslinkable aramid copolymer is performed by spinning or molding.

* * * * *